(12) United States Patent
Perricone (10) Patent No.: US 10,388,461 B2
(45) Date of Patent: Aug. 20, 2019

(54) CAPACITOR ARRANGEMENTS (71) Applicant: Nicholas V. Perricone, Madison, CT (US)

(72) Inventor: Nicholas V. Perricone, Madison, CT (US)

(73) Assignee: PerriQuest Defense Research Enterprises, LLC, Meriden, CT (US)

( * ) Notice: Subject to any disclaimer, the term of this patent is extended or adjusted under 35 U.S.C. 154(b) by 20 days.

(21) Appl. No.: 15/666,733

(22) Filed: Aug. 2, 2017

(65) Prior Publication Data
US 2019/0043670 A1 Feb. 7, 2019

(51) Int. Cl.
H01G 4/38 (2006.01)
H01G 11/10 (2013.01)

(52) U.S. Cl.
CPC ............. H01G 4/38 (2013.01); H01G 11/10 (2013.01)

(58) Field of Classification Search
CPC .................................. H01G 2/04; H01G 4/30
See application file for complete search history.

(56) References Cited

U.S. PATENT DOCUMENTS

| 3,787,718 | A | 1/1974 | Patterson | |
|---|---|---|---|---|
| 5,367,437 | A | * | 11/1994 | Anderson ................ H01G 4/38 257/533 |
| 5,464,652 | A | | 11/1995 | Himmel et al. |
| 5,635,421 | A | | 6/1997 | Ting |
| 5,909,389 | A | | 6/1999 | Kawakubo et al. |
| 5,909,625 | A | | 6/1999 | Lim |
| 7,303,927 | B2 | | 12/2007 | Isobe et al. |
| 7,403,147 | B2 | | 7/2008 | Klaassen |
| 7,557,015 | B2 | | 7/2009 | Sandhu et al. |
| 7,755,910 | B2 | | 7/2010 | Mashino |
| 7,794,840 | B2 | | 9/2010 | Grigorian et al. |
| 8,188,786 | B2 | | 5/2012 | Hsu et al. |
| 8,211,590 | B2 | | 7/2012 | Hojo et al. |
| 9,589,727 | B2 | | 3/2017 | Lazarev |
| 9,595,399 | B2 | | 3/2017 | Tanaka et al. |

(Continued)

FOREIGN PATENT DOCUMENTS

| CN | 203415415 U | 1/2014 |
|---|---|---|
| GB | 769794 A | 3/1957 |
| GB | 823034 A | 11/1959 |

(Continued)

Primary Examiner — Eric W Thomas
(74) Attorney, Agent, or Firm — Wolf, Greenfield & Sacks, P.C.

(57) ABSTRACT

The present invention generally relates to arrangements for capacitors, for example, for energy storage and other applications. Certain aspects are generally directed to a plurality of capacitors, packed into various 2- and 3-dimensional arrays. The capacitors may have any suitable shape, including spherical and/or cylindrical. The capacitors may be packed into a variety of efficient arrangements, for example, face-centered cubic arrangements, hexagonal close packed arrangements, Barlow packing arrangements, or the like. In some cases, such capacitors may be packed with packing fractions of at least 55%, 60%, or more. Other embodiments of the present invention are generally directed to methods of making or using such capacitor arrangements, kits involving such capacitor arrangements, or the like.

19 Claims, 3 Drawing Sheets (56) References Cited

U.S. PATENT DOCUMENTS

2007/0086146 A1* 4/2007 Timmerman ............ H01G 2/04
361/434

FOREIGN PATENT DOCUMENTS

| GB | 2232474 A | 12/1990 |
|----|-----------|---------|
| RU | 2170469 C1 | 7/2001 |
| WO | WO 03/102756 A2 | 12/2003 |

* cited by examiner

CAPACITOR ARRANGEMENTS

FIELD

The present invention generally relates to arrangements for capacitors, for example, for energy storage and other applications.

BACKGROUND

A capacitor is an electrical component that is able to store electrical energy. Typically, a capacitor includes two conductors, separated by a non-conductive region (e.g., a dielectric). Electrical energy is thus stored as a separation of charge within the capacitor. A capacitor may also be formed as a singular conductor such as a conductive sphere having a certain amount of unipolar charge, where electrical energy is stored in the form of electric fields between the singular conductor and a potential that is far away from the conductor. Capacitors are used in a variety of electronic applications, and are increasingly being studied for use in energy storage applications. However, for capacitor technologies to be more widely adopted, improvements in the ability to store larger amounts of energy in smaller volume will be required.

SUMMARY

The present invention generally relates to arrangements for capacitors, for example, for energy storage and other applications. The subject matter of the present invention involves, in some cases, interrelated products, alternative solutions to a particular problem, and/or a plurality of different uses of one or more systems and/or articles.

In one aspect, the present invention is generally directed to an electrical device. According to a first set of embodiments, the electrical device comprises an electrical circuit comprising at least 10 capacitors in electrical communication. In some cases, the capacitors may be positioned in a face-centered cubic lattice.

In another set of embodiments, the electrical device comprises an electrical circuit comprising at least 10 capacitors in electrical communication, positioned in a hexagonal close packed arrangement.

The electrical device, in yet another set of embodiments, comprises an electrical circuit comprising at least 10 capacitors in electrical communication, positioned in a Barlow packing arrangement.

According to still another set of embodiments, the electrical circuit comprises at least 10 capacitors in electrical communication, positioned in a regular 3-dimensional array that is not a primitive cubic Bravais lattice.

In one set of embodiments, the electrical device comprises an electrical circuit comprising at least 10 substantially spherical capacitors in electrical communication, having a packing fraction of at least 64%.

In another set of embodiments, the electrical device comprises an electrical circuit comprising at least 10 substantially cylindrical capacitors in electrical communication, positioned in a hexagonal tiling arrangement.

The electrical device, in still another set of embodiments, comprises an electrical device comprising an electrical circuit comprising at least 10 capacitors in electrical communication, defining at least three planar layers of capacitors. In some embodiments, at least some of the capacitors in the planar layers are positioned in hexagonal tiling arrangements. In some cases, the at least three planar layers may be substantially parallel.

In yet another set of embodiments, the electrical circuit comprises at least 10 capacitors in electrical communication, defining at least three planar layers. In some cases, at least some of the capacitors in the planar layers are positioned in a regular arrangement. In some cases, the planar layers have an average distance of separation that is less than an average diameter of the capacitors. In some cases, the at least three planar layers may be substantially parallel.

Still another set of embodiments is generally directed to an electrical device comprising an electrical circuit comprising at least 10 capacitors in electrical communication. In some embodiments, the centers of any 3 mutually adjacent capacitors of the at least 10 capacitors define an equilateral triangle.

In another aspect, the present invention encompasses methods of making one or more of the embodiments described herein, for example, a packed array of capacitors. In still another aspect, the present invention encompasses methods of using one or more of the embodiments described herein, for example, a packed array of capacitors.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to arrangements for capacitors, for example, for energy storage and other applications. Certain aspects are generally directed to a plurality of capacitors, packed into various 2- and 3-dimensional arrays. The capacitors may have any suitable shape, including spherical and/or cylindrical. The capacitors may be packed into a variety of efficient arrangements, for example, face-centered cubic arrangements, hexagonal close packed arrangements, Barlow packing arrangements, or the like. In some cases, such capacitors may be packed with packing fractions of at least 55%, 60%, or more. Other embodiments of the present invention are generally directed to methods of making or using such capacitor arrangements, kits involving such capacitor arrangements, or the like.

Figure 1A:
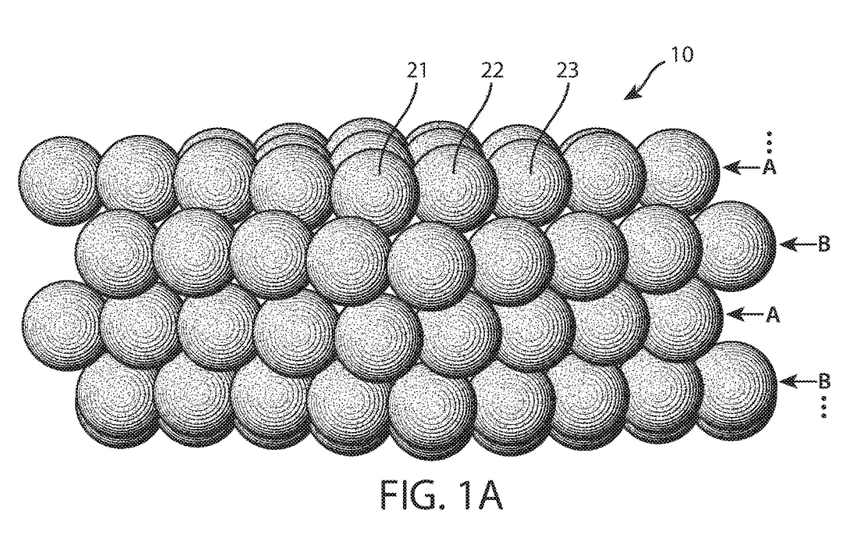
FIGS. 1A-1B illustrate capacitors packed within an array, in accordance with certain embodiments of the invention.

One example of an embodiment of the invention is now described with respect to FIG. 1A. As will be discussed in more detail below, in other embodiments, other configurations may be used as well. In this figure, a plurality of substantially spherical capacitors 21, 22, 23, ... is shown within an array 10. The spherical capacitors can be of any suitable size, e.g., having an average characteristic dimension of at least about 1 mm, or other dimensions such as those described herein. Spherical capacitors are shown in this example, although in other embodiments, some or all of the capacitors may have other shapes, such as cylindrical, etc. The array of capacitors may be used for a variety of energy storage applications, such as electric vehicles, power supplies, portable computers, and the like.

Figure 4A:
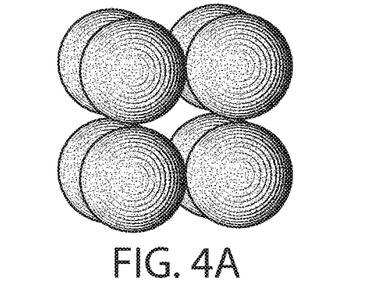
FIGS. 4A-4B illustrate simple cubic packing.

In this figure, the capacitors are packed into a regular arrangement, generally analogous to an atomic crystal lattice. The capacitors may be wired together to form an electric circuit, e.g., in a parallel and/or a series arrangement (wiring not shown). The capacitors can be packed within the array in a variety of space-saving arrangements, such as face-centered cubic arrangements, hexagonal close packed arrangements, Barlow packing arrangements, or the like. While others have suggested packing capacitors in a rectangular grid (e.g., a primitive cubic arrangement, as shown in FIG. 4A), such arrangements are not particularly efficient, often resulting in packing efficiencies or packing fractions of less than about 55%, e.g., for spherical capacitors. In contrast, in certain embodiments, relatively high packing fractions may be achieved, e.g., through the use of various packing arrangements such as those described herein.

Figure 2:
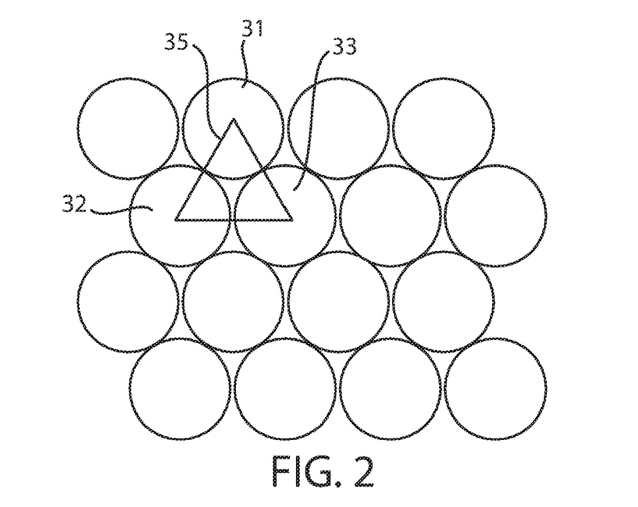
FIG. 2 illustrates hexagonal tiling of capacitors, in another embodiment of the invention.
Figure 4B:
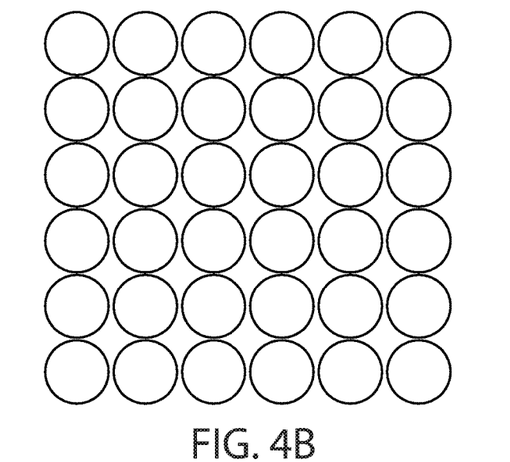

In FIG. 1A, the capacitors are packed into a hexagonal closest packed (hcp) structure. The capacitors may be thought of as being in various planes A and B, with the capacitors in each plane arranged in a hexagonal tiling arrangement, e.g., as is shown in FIG. 2. Within the hexagonal tiling arrangement, centers of three mutually adjacent capacitors may in some cases define an equilateral triangle; an example is indicated by triangle 35, connecting the centers of capacitors 31, 32, and 33. (In contrast, in a primitive cubic arrangement, the capacitors are packed into a square configuration, such as is shown in FIG. 4B.)

Figure 1B:
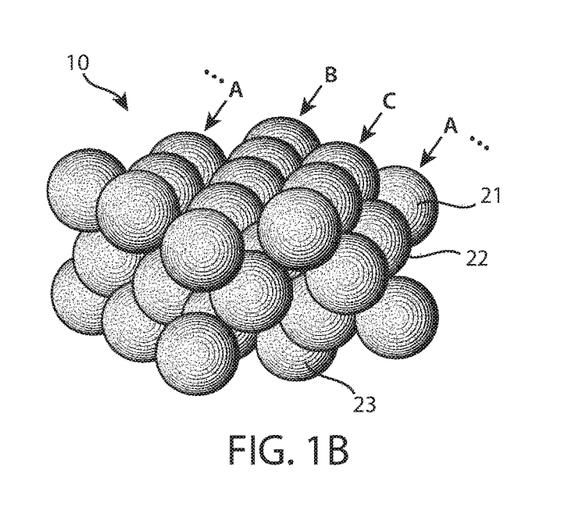

The capacitors in one plane of an array can be offset relative to an adjacent plane. In FIG. 1A, the B plane is positioned such that the centers of the capacitors of the B plane are offset relative to the capacitors in the A plane, for example, such that the centers of the capacitors are centered with respect to the "holes" or interstices of the plane below. This can be seen more clearly in FIG. 3A with the planes of capacitors indicated with different shading. If the next plane is then aligned with respect to the A plane, then the next plane aligned with respect to the B plane, and this pattern is repeated, then an ABABAB ... pattern of alignment results, forming the hexagonal closest packed structure shown in FIG. 1A. However, if the next plane is aligned differently than the A and B planes (i.e., aligned with a different set of interstices), and this 3-cycle pattern is repeated, then an ABCABCABC ... pattern of alignment of the planes results, which forms a face-centered cubic (fcc) packing structure, as is shown in FIG. 1B, with a plurality of substantially spherical capacitors 21, 22, 23, .... (The name "face-centered cubic packing structure" comes from looking at the structure at a different angle, which has cubic symmetry.) This alignment of capacitors can be seen more clearly in FIG. 3B.

Thus, in various aspects, a plurality of capacitors can be efficiently packed together to form an array. Any suitable number of capacitors may be used, which may be arranged as discussed herein. For example, in various embodiments, there may be at least 10 capacitors assembled together in an array. In some embodiments, there may be at least 15, at least 20, at least 25, at least 30, at least 50, at least 75, at least 100, at least 150, at least 200, at least 300, at least 500, at least 750, or at least 1000 capacitors assembled together in an array. In some cases, the capacitors may be aligned to form a 2-dimensional array (e.g., such that the array is only one capacitor thick), although in other embodiments, the array may be a 3-dimensional arrangement of capacitors, such as is shown in FIGS. 1A-1B.

In some cases, the array of capacitors can be wired together in one or more electric circuits. For example, some or all of the capacitors within an array may be wired together in a parallel and/or a series arrangement. In some cases, for example, a plurality of capacitors can be connected together in parallel to increase their effective capacitance. Other wiring arrangements of capacitors may also be used in some embodiments.

As mentioned, in various embodiments, the capacitors are arranged in a hexagonal closest packed structure, e.g., as shown in FIG. 1A, or a cubic closest packing structure, e.g., as is shown in FIG. 1B. While such structures are ordinarily used to describe atoms within a crystal, it should be understood that such structures are also applicable to larger objects, such as the capacitor arrangements described herein. In addition, it should be understood that although many of the figures depict spherical capacitors, this is by way of ease of presentation only. In other embodiments, as mentioned, the capacitors can have a variety of shapes (e.g., cylindrical), and in some cases, more than one shape of capacitor may be present within the structure.

In arrangements such as these, the capacitors may be thought of as being arranged in a plurality of planar layers. In some cases, the planar layers may be substantially parallel. Within each layer, the capacitors can be positioned in a regular arrangement, e.g., one that can be characterized as a repeating or predictable array, as opposed to a random arrangement of capacitors. For instance, in one set of embodiments, the capacitors in a plane may be positioned in a hexagonal tiling arrangement, e.g., as is shown in FIG. 2. Thus, the centers of three mutually adjacent capacitors can define an equilateral triangle (identified as 35 in this figure). This may be true regardless of the orientation or alignment of the planes within the array. In certain embodiments, for all of the capacitors within an array, at least 25%, at least 50%, at least 75%, at least 80%, at least 85%, at least 90%, at least 95%, or all of the capacitors within the array may be in contact with other capacitors such that any three mutually adjacent capacitors define an equilateral triangle. This may also apply to systems other than spherical capacitors; for example, an array comprising a plurality of substantially cylindrical capacitors may also exhibit such packing, e.g., in a hexagonal tiling arrangement as is shown in FIG. 2 (for example, where the circles represent cross-sections of the cylindrical capacitors).

Figure 3A:
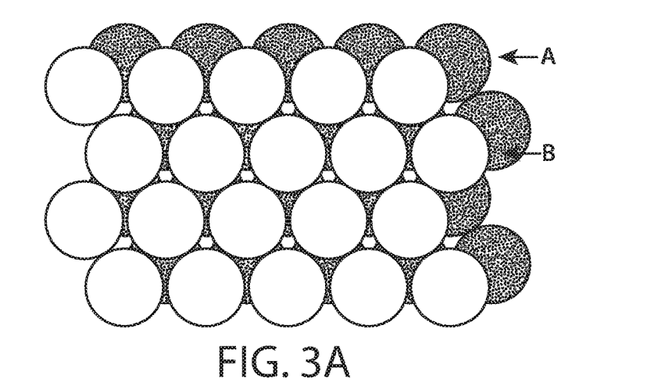
FIGS. 3A-3B illustrate the alignment of capacitor layers within an array, in certain embodiments of the invention.
Figure 3B:
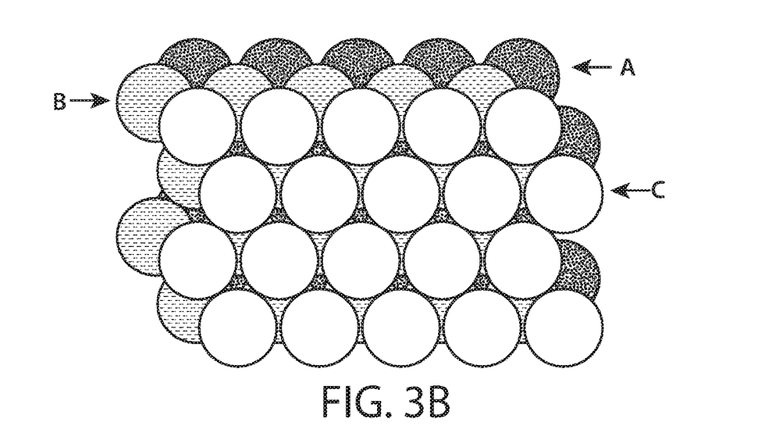

Capacitors in an adjacent layer within the array may be offset relative to the first planar layer, as is shown in FIGS. 1A-1B, and this process may be repeated for additional adjacent layers of capacitors. There may be at least 3, at least 4, at least 5, at least 10, at least 15, at least 20, at least 25, at least 30, at least 50, at least 75, or at least 100 or more layers of capacitors within an array in various embodiments. As is shown in FIG. 3A, if a third layer of capacitors is aligned directly over the first layer, and this pattern is then repeated to form an ABABABAB ... structure, then a hexagonal closest packed (hcp) structure results. However, as is shown in FIG. 3B, if the third layer of capacitors is not aligned directly over the first layer, but instead is aligned over a different set of interstices, and this pattern is repeated (i.e., forming an ABCABCABC . . . structure), then a face-centered cubic closest packing structure can result (cF, designating a face-centered cubic Bravais lattice). In addition, in some embodiments, these motifs may be combined in various combinations of these, including periodic and/or random combinations, producing various packing arrangements, such as Barlow packing arrangements, for example, having various combinations of the A, B, and C alignments.

In one set of embodiments, the separation of layers of capacitors within an array may, on average, be less than an average characteristic dimension of the capacitors. Unlike in a primitive cubic Bravais lattice structure (e.g., a rock-salt) structure such as is shown in FIG. 4A, the capacitors in an array can be positioned in a more tightly packed arrangement, for example, such that the average distance of separation of layers is less than 0.95, 0.9, 0.85, or 0.8 times the average characteristic dimension of the capacitors. Thus, as a non-limiting example, planes A and B in FIG. 1A (containing the centers of the capacitors) may be separated by a distance that is smaller than the average characteristic dimension of the capacitors forming those planes.

In one set of embodiments, the capacitors may be packed within the array at a packing fraction of at least 55%. In some cases, the packing fraction may be 60%, 65%, 70%, 75%, 80%, 85%, 90%, or more in some cases. The packing fraction (typically expressed as a percentage) may be thought of as the space (volume) within the array occupied by the capacitors, relative to the total space within the array. Without wishing to be bound by any theory, certain shapes of capacitors (such as spherical or cylindrical capacitors) are difficult to pack into a small region without creating relatively large voids, e.g., that are not occupied by capacitors. Some types of packings, such as a primitive cubic Bravais lattice, cannot be efficiently packed using spheres, and instead result in large voids and relatively low packing fractions (e.g., less than about 55%). In contrast, arrays of capacitors structured as discussed herein can exhibit higher packing fractions.

In addition, other packing arrangements for capacitors may also be possible in some cases. In one set of embodiments, the capacitors are packed in a regular arrangement that is not a primitive cubic Bravais lattice (e.g., a rock-salt structure). Non-limiting examples of other structures include body-centered cubic arrangements, hexagonal arrangements, tetragonal arrangements (e.g., primitive, base-centered, body-centered, face-centered, etc.), orthorhombic arrangements (e.g., primitive, base-centered, body-centered, face-centered, etc.), or the like.

A variety of capacitors can be used within the array, in certain aspects of the invention. Many types of capacitors are readily available commercially. The capacitors within an array may all independently be the same, and/or there may be more than one type of capacitor present within the array. For example, one or more capacitors within an array can have the same shape, the same size, and/or the same capacitance, or a variety of capacitors with different shapes, sizes, and/or capacitances may be used within an array.

It should be appreciated that some or all of the capacitors within the array may comprise one or more conductive elements as electrodes. In some embodiments, a capacitor comprises two conductors separated by a dielectric within the general shape of the capacitor and the capacitor is configured to store electric energy in the form of electrical charges of opposite polarities stored on each of the respective conductors. In some embodiments, a capacitor comprises a single conductor configured to store electric energy in the form of electrical charges of a unitary polarity stored on the conductor. A variety of techniques may be used to apply charge to a capacitor, including connecting it to a suitable voltage source, such as a battery or a DC power supply. In some cases, direct current may be used to charge a capacitor. In some cases, the current may be created by inductive charging techniques. Techniques that inductive charge using AC may be converted to DC, for example, using rectifiers, diodes, or other AC to DC converters, some of which are available commercially.

Thus, for example, the capacitors within the array may independently have any suitable capacitance, and may all have the same capacitance, or a variety of capacitances may be present within an array, e.g., two or more capacitances. In some embodiments, for instance, at least 25%, at least 50%, at least 75%, at least 80%, at least 85%, at least 90%, at least 95%, or all of the capacitors within the array may independently have the same capacitance. As non-limiting examples, the capacitance of a capacitor within the array can be at least 1 aF, at least 10 aF, at least 100 aF, at least 1 fF, at least 10 fF, at least 100 fF, at least 1 pF, at least 10 pF, at least 100 pF, at least 1 microfarad, at least 10 microfarads, at least 100 microfarads, at least 1 mF, at least 10 mF, at least 100 mF, at least 1 F, at least 10 F, at least 100 F, etc., and various capacitances within the array may have these and/or other capacitances.

In one set of embodiments, the array of capacitors may include a plurality of conductors (e.g., conductive spheres or cylinders) having a unipolar charge. Electrical energy may be stored within the capacitors in the form of electric fields between the conductor and a potential far away from the conductor. In some cases, the capacitors within the array of capacitors may each have the same polarity (e.g., all positively or all negatively charged), although in some embodiments, different capacitors may have different polarities. In addition, the capacitors may each independently have the same, or different charges (or abilities to carry charge).

The capacitors within the array may also independently have any suitable shape, and may all be of the same shape, or a variety of shapes can be present. In some cases, for example, at least 25%, at least 50%, at least 75%, at least 80%, at least 85%, at least 90%, at least 95%, or all of the capacitors within the array may independently be of the same shape. Examples of capacitor shapes include, but are not limited to, spherical, cylindrical, rod-shaped, disk-shaped, spherocylindrical, block, rectangular, cubical, or the like. Irregular shapes are also possible. In one set of embodiments, some or all of the capacitors are substantially spherical. In some cases, some or all of the capacitors are substantially cylindrical.

In one set of embodiments, for example, spherical capacitors may be used since their shape may prevent or reduce the leakage, e.g., loss of energy or electrons from the capacitor. In some cases, the leakage of a capacitor may relate, at least in part, to the shape of a capacitor. For example, sharp points or edges on a shape may concentrate the electric field at those points or edges and facilitate leakage. In contrast, spherical capacitors (or other shapes, such as cylindrical) may have relatively small numbers of such points in which leakage can occur. In some cases, the capacitors may be fabricated to be relatively smooth to minimize imperfections that may allow leakage from the capacitors to occur.

In addition, the capacitors within the array can independently have any suitable size, and may all be of the same size, or a variety of sizes may be present. For example, in some cases, at least 25%, at least 50%, at least 75%, at least 80%, at least 85%, at least 90%, at least 95%, or all of the capacitors within the array may independently have substantially identical dimensions. In certain cases, the capacitors within the array may exhibit an average characteristic dimension of at least 0.01 mm, at least 0.1 mm, at least 0.3 mm, at least 0.5 mm, at least 1 mm, at least 3 mm, at least 5 mm, at least 1 cm, at least 3 cm, at least 5 cm, at least 10 cm, at least 30 cm, at least 50 cm, at least 100 cm, or the like. The characteristic dimension of a capacitor may be taken as the diameter of a perfect sphere having the same overall volume as the capacitor.

It should be understood that in some cases, a spherical capacitor may not necessarily be perfectly mathematically spherical. In some cases, for example, there may be deviations of varying degrees within the capacitor from a perfect sphere. In some cases, as non-limiting examples, the capacitor may have deviations of less than 20%, less than 15%, less than 10%, less than 5%, less than 3%, etc. from a perfect sphere (e.g., by volume), and/or there may be indentations, protrusions, holes, or the like within the sphere. Such deviations may be used, for example, to immobilize the capacitor within the array, to provide for electrical connections to the capacitor, defects caused by the manufacturing process, or the like. Similarly, it should be understood that a substantially cylindrical capacitor may not necessarily be perfectly cylindrical, and can, for example, have deviations such as those described in this paragraph.

In certain embodiments, one or more capacitors within the array may include one or more dielectrics, e.g., to increase the capacitance of the capacitor. Non-limiting examples of dielectrics that can be used include paper, glass, ceramic, polymers (e.g., polyacrylic), paper, mica, gases such as air, and oxides (e.g., $TiO_2$). A vacuum may be used as a dielectric in some cases. Additional non-limiting examples include PTFE, polyethylene, polyimide, polypropylene, polystyrene, carbon disulfide, mylar, silicon dioxide, sapphire, concrete, pyrex, neoprene, rubber, diamond, salt, graphite, silicon, silicon nitride, ammonia, methanol, ethylene glycol, furfural, glycerol, water, hydrazine, formamide, sulfuring acid, hydrogen peroxide, and/or titanates such as strontium titanate, barium strontium titanate, barium titanate, lead zirconate titante, calcium copper titanate, etc. Combinations of any of these and/or other dielectrics can also be used in some embodiments.

In some cases, the capacitors within the array may independently have any suitable dielectric, and can all have the same dielectric, or a variety of dielectrics may be present within an array, e.g., two or more dielectrics. In some embodiments, for instance, at least 25%, at least 50%, at least 75%, at least 80%, at least 85%, at least 90%, at least 95%, or all of the capacitors within the array may independently have the same dielectric.

The dielectric may have any suitable relative permittivity (K), for example, at least 1, at least 2, at least 3, at least 4, at least 5, at least 6, at least 8, at least 10, at least 15, at least 20, at least 25, at least 30, at least 40, at least 50, at least 60, at least 70, at least 80, at least 100, at least 125, at least 150, at least 200, at least 300, at least 400, at least 500, at least 750, at least 1000, at least 2000, at least 3000, at least 5000, at least 10,000, at least 30,000, at least 50,000, at least 100,000, at least 200,000, etc.

In some embodiments, one or more capacitors within the array may be supercapacitors. Supercapacitors typically use electrostatic double-layer electrostatic capacitance and/or electrochemical pseudocapacitance to produce surprisingly high capacitances. Some supercapacitors may achieve capacitances of at least 1 F, or more in some cases. As an example, in a hybrid supercapacitor, one electrode may use electrostatic capacitance while the other electrode may use electrochemical capacitance. Electrostatic capacitance within a supercapacitor may be achieved, for example, using separation of charge in a Helmholtz double layer at the interface between the surface of a conductive electrode and an electrolyte (if one is present). The separation of charge may be less than 1 nm in some cases. Pseudocapacitance can be achieved, for example, by Faradaic electron charge-transfer with redox reactions, intercalation, electrosorption, etc. Examples of supercapacitors include, but are not limited to, lithium-ion capacitors, activated carbon capacitors, carbon aerogel capacitors, carbon nanotube capacitors, carbide-derived carbon capacitors, graphene-based supercapacitors, capacitors containing $MnO_2$ electrodes, capacitors containing $RuO_2$ electrodes, capacitors containing transition metal oxide electrodes such as $RuO_2$ $IrO_2$, $Fe_3O_4$, $MnO_2$, capacitors containing transition metal sulfide electrodes such as $TiS_2$, etc. Several types of supercapacitors are readily available commercially.

Figure 5:
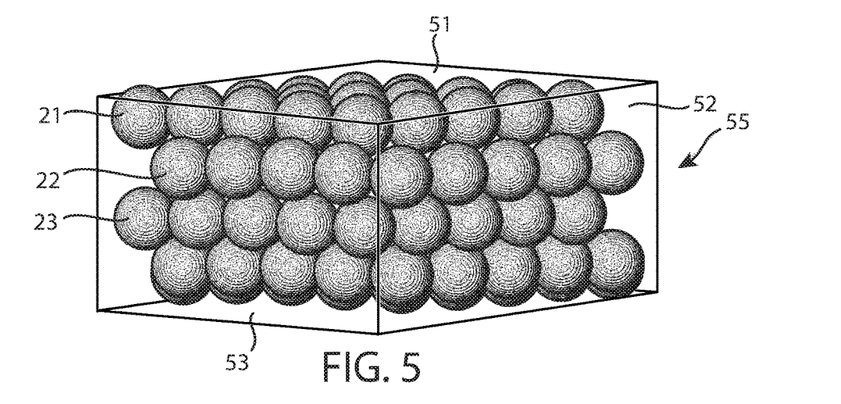
FIG. 5 illustrates a plurality of capacitors physically contained within an array, in yet another embodiment of the invention.

In some aspects, the capacitors can be present within an array in a regular arrangement, although in other embodiments, non-regular arrangements may be used. In some cases, for example, the array of capacitors may have a substantially rectangular shape (for example, cubical or block-shaped, etc.), such as is shown in FIG. 5, although in other arrangements, the overall shape of the array of capacitors may be cylindrical, spherical, or the like. It should be noted that the shape of the array of capacitors and the shape of the capacitors within the array need not be the same, although they can be in some cases.

The array may have any suitable dimensions. For example, the array of capacitors may have a substantially rectangular shape, with one or more dimensions (e.g., height, length, and/or width) that independently is at least 1 cm, at least 3 cm, at least 5 cm, at least 10 cm, at least 30 cm, at least 50 cm, at least 1 m, at least 3 m, at least 5 m, at least 10 m, or the like. Thus, as a non-limiting example, the array may have dimensions of 50 cm×1 m×1 m. Similarly, if the array of capacitors has a substantially cylindrical shape or a substantially spherical shape, the array may have one or more dimensions (e.g., height and/or diameter) that independently are of those described above.

In some cases, the array may have an overall capacitance of at least 1 aF, at least 10 aF, at least 100 aF, at least 1 fF, at least 10 fF, at least 100 fF, at least 1 pF, at least 10 pF, at least 100 pF, at least 1 microfarad, at least 10 microfarads, at least 100 microfarads, at least 1 mF, at least 10 mF, at least 100 mF, at least 1 F, at least 10 F, at least 100 F, etc. In some cases, the array may have an overall capacitance per unit volume of at least 1 $pF/m^3$, at least 10 $pF/m^3$, at least 100 $pF/m^3$, at least 1 microfarad/$m^3$, at least 10 microfarads/$m^3$, at least 100 microfarads, at least 1 $mF/m^3$, at least 10 $mF/m^3$, at least 100 $mF/m^3$, at least 1 $F/m^3$, at least 10 $F/m^3$, at least 100 $F/m^3$, at least 1,000 $F/m^3$, at least 10,000 $F/m^3$, at least 100,000 $F/m^3$, etc.

The capacitors may be immobilized within the array using a variety of approaches. For example, one or more capacitors may be held in place within the array using a plurality of walls, rods, shelves, ledges, or other structural members. In some cases, one or more capacitors can be immobilized to such members, for example, using screws, solder, or the like. In certain embodiments, one or more capacitors may be contained within the array passively, for example, held in place by physical constraints. For example, capacitors can be held in place due to the positioning of surrounding capacitors, walls or other structural members of the array, or the like. As a non-limiting example, in FIG. 5, a plurality of capacitors 21, 22, 23, . . . are contained as an array within container 55, formed from a plurality of walls 51, 52, 53, . . . .

Arrays of capacitors such as those discussed herein can be used for a variety of applications in various aspects. For example, such arrays of capacitors may be used in any suitable application where capacitors are used. In some cases, due to the packing of capacitors within the array, relatively high capacitances per unit volume may be achieved, which may be useful in certain applications, such as portable electronics or computers, where relatively small volumes are desired.

As another example, in some embodiments, arrays of capacitors such as those discussed herein may be used in various energy storage applications. Non-limiting of examples of energy storage applications include electric vehicles, power supplies, portable computers, UPS systems, network applications, or the like. Capacitors can store electric energy, which can then be discharged or harnessed as needed. Thus, in some cases, arrays of capacitors such as those discussed herein may be used in any suitable application where batteries are used. In some cases, relatively large amounts of energy may be stored in the array, which may provide relatively high amounts of power for relatively small weights and/or volumes. In addition, in some cases, the use of capacitors may provide certain advantages, such as faster charging times, relative to batteries.

In some embodiments, arrays of capacitors such as those discussed herein can be used for various pulsed power applications. Non-limiting examples of such applications include electromagnetic forming, Marx generators, pulsed lasers (e.g., transversely excited atmospheric lasers), pulse forming networks, fusion devices, particle accelerators, explosive detonators, thyratrons, ignitrons, crossatrons, electromagnetic pulse welding, explosively pumped flux compression generators, compulsators, electromagnetic pulse generators, or as power sources for electromagnetic armor, electromagnetic railguns, coilguns, or the like.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrical device, comprising:
    an electrical circuit comprising at least 10 capacitors in electrical communication, positioned in a face-centered cubic lattice.

2. The electrical device of claim 1, wherein at least some of the capacitors are substantially spherical.

3. The electrical device of claim 1, wherein at least some of the capacitors are connected in parallel in the electrical circuit.

4. The electrical device of claim 1, wherein at least some of the capacitors are connected in series in the electrical circuit.

5. The electrical device of claim 1, wherein the capacitors define a 3-dimensional array of capacitors, the array having a minimum cross-sectional dimension of at least 10 cm.

6. The electrical device of claim 1, wherein the capacitors have a packing fraction of at least 64%.

7. The electrical device of claim 6, wherein the capacitors have a packing fraction of at least 72%.

8. The electrical device of claim 1, wherein the capacitors define at least three substantially parallel planar layers of capacitors.

9. The electrical device of claim 8, wherein at least some of the capacitors in the planar layers are positioned in a hexagonal tiling arrangement.

10. The electrical device of claim 8, wherein the planar layers have an average distance of separation that is less than an average characteristic dimension of the capacitors.

11. The electrical device of claim 10, wherein the planar layers have an average distance of separation that is less than 0.9 times the average characteristic dimension of the capacitors.

12. The electrical device of claim 1, wherein the centers of any 3 mutually adjacent capacitors of the at least 10 capacitors define an equilateral triangle.

13. An electrical device, comprising:
    an electrical circuit comprising at least 10 substantially spherical capacitors in electrical communication, having a packing fraction of at least 64%.

14. The electrical device of claim 13, wherein the packing fraction is at least 72%.

15. The electrical device of claim 13, wherein the capacitors define a 3-dimensional array of capacitors, the array having a minimum cross-sectional dimension of at least 10 cm.

16. The electrical device of claim 13, wherein the capacitors define at least three substantially parallel planar layers of capacitors.

17. An electrical device, comprising:
    an electrical circuit comprising at least 10 capacitors in electrical communication, defining at least three substantially parallel planar layers, at least some of the capacitors in each of the planar layers positioned in a regular arrangement of at least three capacitors positioned non-linearly, wherein the planar layers have an average distance of separation that is less than an average characteristic dimension of the capacitors.

18. The electrical device of claim 17, wherein at least some of the capacitors are substantially spherical.

19. The electrical device of claim 17, wherein the planar layers have an average distance of separation that is less than 0.9 times an average characteristic dimension of the capacitors.

* * * * *